Feb. 2, 1960   F. W. N. DUFFIELD ET AL   2,923,359
CLEVIS JOINTS
Filed July 18, 1957
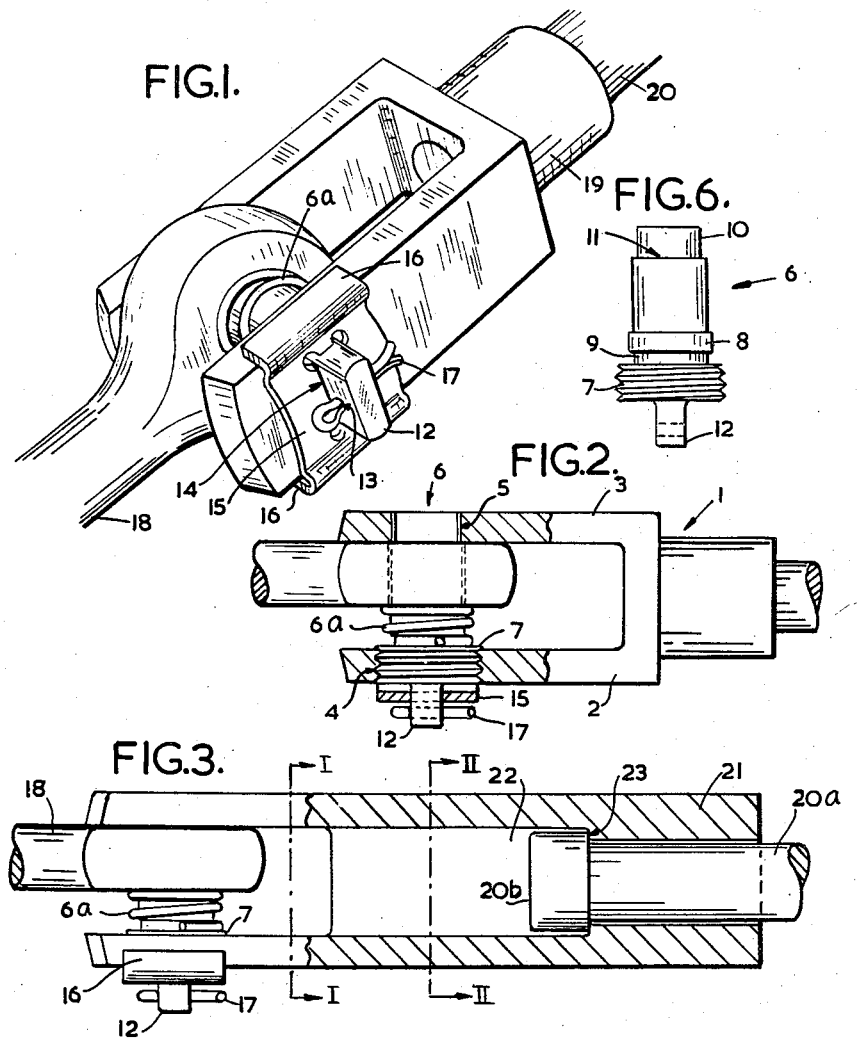
INVENTORS
FRANCIS W. N. DUFFIELD,
PATRICK J. H. RILEY &
ALFRED T. BOWATER;

_United States Patent Office_

2,923,359
Patented Feb. 2, 1960

2,923,359
CLEVIS JOINTS

Francis Walter Norman Duffield, Four Oaks, Sutton Coldfield, Patrick James Hargreaves Riley, Moseley, Birmingham, and Alfred Thomas Bowater, West Hagley, England Application July 18, 1957, Serial No. 672,774

Claims priority, application Great Britain July 20, 1956

3 Claims. (Cl. 287—100)

This invention has reference to clevis joints such as used in automobiles and other vehicles and mechanical assemblies in general, for coupling together lengths of rod and/or cable, for example, the power transmission rods and/or cables of braking systems, and for coupling controls to said rod and/or cable.

Such a joint includes a bifurcated clevis which is secured to the end of one rod or cable and between the arms of which the apertured or eyed end of a lever or another rod or cable is coupled by the shank of a headed pin extending through holes in the clevis arms and the said apertured or eyed end so that the head of the pin abuts the outer face of the one arm and the tail of the shank projects beyond the outer face of the other arm, the pin being retained in the clevis by passing a split pin through a transverse hole in the projecting tail.

It is realized that the use of a split pin for retaining the headed coupling pin in the clevis, is not absolutely safe and frequent supervision is required, particularly in the braking systems of vehicles, to ensure that the split pins of the clevis joints in the said systems are in position and in a sound condition. It is also known that clevis joints form the source of a considerable amount of rattle due either to loose fits between the component parts of the joints, to wear of one or more of the said parts, or to contact between the joints and the eyed ends coupled thereto and/or between joints located in close proximity to one another, the rattles being more pronounced when the joints are not under load or are under light load.

In an attempt to overcome or minimise these disadvantages, it has been proposed in the specification of Letters Patent No. 2,344,808, issued March 21, 1944, to P. J. H. Riley and F. W. N. Duffield, to provide around the headed pin and between one arm of a bifurcated clevis and the eyed end of a lever, rod or cable coupled thereto, a coil spring which is partially compressed between the arm and end, and to provide the coupling pin with a threaded head which is screwed into one of the clevis arms, a transverse hole in the projecting tail of the pin again being engaged by a split pin externally of the clevis.

However, when any appreciable turning movement is impressed upon the coupling pin, for example, when a lever journalled upon the pin is actuated to apply a brake, the pin may be rotated in the direction which withdraws its threaded head from the tapped arm, thereby applying to the split pin a shearing force which could cause failure of the said split pin and eventually permit complete withdrawal of the coupling pin from the clevis.

The principal object of the present invention is to prevent, in a simple, expedient and economical manner, such a dangerous eventuality from arising.

A further object of the invention is to ensure that the coupling pin of a clevis joint in which the pin is screw-connected in the clevis, is prevented from rotating within and relatively to the clevis.

Still another object of the invention is to provide a lost-motion connection between the clevis of a clevis joint and the rod or cable secured thereto so that in systems wherein the said rod or cable is adapted to be actuated by either of two different controls, of which one is coupled to the clevis by the coupling pin, the other of said controls may be operated without affecting the said one control.

In accordance with the said invention, a clevis joint comprises a threaded coupling pin which is screw-connected in a tapped hole in one arm of a bifurcated clevis and is formed with a portion of non-circular section, the said non-circular portion extending through a hole, of corresponding non-circular shape, in a locking plate seated upon one of the clevis arms and provided with at least one lip which laps an edge of the arm on which the plate seats.

Preferably the non-circular pin portion consists of an ear provided upon one end of the coupling pin and projecting to the exterior of the clevis, the lip or lips of the locking plate being retained in lapping relationship to the clevis arm by a split pin which extends through a transverse hole in the ear.

The base of the clevis may be formed with a longitudinal bore having a restriction between its ends and the rod or cable screwed to the clevis may be slidable lengthwise of the bore and may be formed or provided with a head or enlargement, which is accommodated between the restriction and the clevis arms. For example, the bore may consist of two co-axial portions of different diameters so that an annular shoulder is provided between the adjoining ends of the said portions of which the larger diameter portion extends from the shoulder to the roots of the clevis arms and accommodates the head or enlargement of the rod or cable.

In order that the invention may more readily be understood and carried into practice, reference will now be made to the accompanying drawing wherein:

Figure 1 is a perspective view of a clevis joint.

Figure 2 is a plan, partly in section and on a smaller scale of the joint shown in Figure 1.

Figure 3 is a plan, partly in section, of a modified or alternative clevis joint.

Figures 4 and 5 are respectively, sections along the lines I—I and II—II, Figure 3, and Figure 6 is an elevation of the coupling pin which forms a part of the said joints.

Each of the clevis joints shown in the drawings comprises a bifurcated clevis 1, the two sides or arms 2 and 3 of which are formed with concentric holes 4 and 5 respectively, the hole 4 being tapped and of larger diameter than the hole 5.

A one piece coupling pin 6 extends between the two arms and engages both the said holes. The pin is formed with threaded head 7 which is screw-connected in the tapped hole and the shank of the pin is formed, adjacent its threaded head, with an enlarged diameter portion 8 (see Figure 6) thereby producing a groove or neck 9 between the said head and enlargement and with a reduced diameter tail 10 which enters the plain hole 5 and forms a peripheral shoulder 11 which enables the tail 10 to be passed into the hole until the said shoulder abuts the internal surface of the clevis arm 3; the head 7 and tail 10 are of such lengths that when the shoulder abuts the said arm surface, the outer face of the head is flush with the external surface of the clevis arm 2 and the end face of the tail is flush with the external surface of the arm 3 so that the pin is accommodated wholly between the said external surfaces.

An ear 12 which is substantially of rectangular section, projects from the outer face of the head 7 and is pierced by a transverse hole 13 which extends between and opens to the two longer faces of the ear.

To prevent rotation of the coupling pin relatively to the clevis after the head has been screwed into the tapped hole to take the shoulder 11 into abutment with the arm 3, a rectangular hole 14 in a locking plate 15 is engaged with the projecting ear until the plate seats upon the outer surface of the clevis arm 2 and lips 16 provided on and extending along opposite edges of the plate, lap the opposite edges of the said arm. The plate is of a length such that the lips seat upon their respective arm edges and a split pin 17 is passed through the transverse hole 13 to prevent removal of the plate from the ear.

A coil spring 6a carried around the shank of the coupling pin, is retained upon the said shank by forcing one of its end convolutions over the enlargement 8 into engagement with the neck 9, the external dimensions of the spring being such that it is able to pass freely through the tapped hole 4. Preferably the convolution at the other end of the spring is in the form of an unbroken ring and is located in a plane normal to the axis of the coupling pin.

The joint is effected merely by inserting the eyed end of a rod 18 or equivalent force-transmitting member between the clevis arms 2 and 3 until the eye in the said member is located between and is concentric to the tapped and plain holes 4 and 5. The coupling pin and spring assembly is then passed through the tapped hole and eye until the spring comes into contact with the rod whereupon, the pin is forced further into the clevis to compress the spring between the rod and the threaded pin head until the said head enters the tapped hole; the pin is then rotated to screw the head into the said hole and to take the tail 10 into engagement with the plain hole 5, the rotation being continued until the shoulder 11 abuts the internal surface of the arm 3; finally, the locking plate is engaged with the ear and is retained in position by inserting the split pin into the hole 13.

If desired, the initial screw-connection between the pin head and clevis may be effected manually by gripping and turning the ear 12, whereas the locking plate may be used as a tool for completing the engagement by reversing the said plate so that the lips 16 project away from the clevis, engaging the hole 14 with the ear and turning the plate by hand. Similarly, when it is desired to dismantle the joint, the locking plate may be employed as a tool for rotating and unscrewing the coupling pin from the clevis.

In the completed joint, the split pin merely retains the locking plate upon the projecting ear and, since the coupling pin is locked against rotation is not subject to shear.

Moreover since the end face of the tail is flush with the external surface of the clevis arm 3, then, if necessary or desirable, two separate joints may be disposed side by side with the respective arms 3 in contact with or in close proximity to one another, or one joint may be disposed alongside some other part of a machine with its side 3 in contact with or in close proximity to the said part, without detriment to the ease and speed with which either of the joints, or the joint may be effected or dismantled.

In the joint shown in Figures 1 and 2, the base of the clevis is formed with a tapped boss 19 which screwed onto the threaded end of a force-transmitting rod 20, whereas, in the joint shown in Figures 3-5, the clevis base consists of a block 21 having a longitudinal bore 22, the said bore being rebated between its ends so that it consists of two portions of different diameters, the larger diameter portion opens to the surface of the base between the roots of the arms 2 and 3, and an annular shoulder 23 is provided between the adjoining ends of the two bore portions.

The force-transmitting rod 20a secured to the clevis shown in Figures 3-5, is slidable within and lengthwise of the bore 22 and is formed with a head or enlargement 20b which is accommodated within the larger diameter bore portion and has a larger diameter than the smaller diameter bore portion, so that the rod is prevented from being withdrawn from the clevis base by the abutment of the said head or enlargement with the annular shoulder.

Consequently, if for example, the force transmitting member 18 which is jointed to the clevis by the coupling pin, consists of a manually-operable lever of a vehicle braking system, the foot brake lever of the said system may be coupled to the rod 20a in any known and desired manner and may be operated without affecting the clevis joint since such operation would merely cause the threaded rod to slide in the bore relatively to the clevis.

What we claim is:

1. A clevis joint comprising a bifurcated clevis, an eye member, a pin jointing the eye member in the clevis, and a coil spring surrounding said pin and anchored thereto and acting on said eyed end, said pin having a threaded head engaging a threaded bore in one side of the bifurcated clevis and a peripheral shoulder adjacent its end remote from the said head for engaging the other side of the clevis to limit the longitudinal movement of the pin in the clevis, a non-circular ear projecting from the head beyond the one side of the clevis, a locking plate provided with a noncircular opening of a size to surround said ear and prevent relative rotation between said plate and said ear, said plate being seated upon the one side of the clevis and provided with a pair of lips which overlap and seat upon the edges of the clevis, and a cotter pin extending through a transverse hole in said ear for retaining the locking plate in engagement with the clevis.

2. A clevis joint as set forth in claim 1, including a groove around the shank of the pin adjacent the threaded head receiving a convolution of the coil spring for retaining the spring upon the pin.

3. A clevis joint as set forth in claim 1, wherein said pin is provided with a tail, the end of which is flush with the outside surface of the other side of the clevis.

References Cited in the file of this patent

UNITED STATES PATENTS

| | | |
|---|---|---|
| 385,526 | Russell | July 3, 1888 |
| 1,113,256 | Smith | Oct. 13, 1914 |
| 1,392,561 | Duffy | Oct. 4, 1921 |
| 1,449,765 | McLaughlin | May 27, 1923 |
| 1,628,119 | Cooke | May 10, 1927 |
| 2,344,808 | Duffield et al. | Mar. 21, 1944 |
| 2,370,944 | Emerson | Mar. 6, 1945 |
| 2,645,439 | Gauthier | July 14, 1953 |